(12) United States Patent
Hagino et al.

(10) Patent No.: US 8,379,222 B2
(45) Date of Patent: Feb. 19, 2013

(54) FIZEAU INTERFEROMETER AND MEASUREMENT METHOD USING FIZEAU INTERFEROMETER

(75) Inventors: Takeshi Hagino, Tsukuba (JP); Yuichiro Yokoyama, Tsukuba (JP); Yutaka Kuriyama, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 78 days.

(21) Appl. No.: 12/962,783

(22) Filed: Dec. 8, 2010

(65) Prior Publication Data

US 2011/0134437 A1 Jun. 9, 2011

(30) Foreign Application Priority Data

Dec. 8, 2009 (JP) ................................ 2009-278218

(51) Int. Cl.
*G01B 11/02* (2006.01)
(52) U.S. Cl. ...................................................... 356/512
(58) Field of Classification Search .................. 356/511, 356/512, 515
See application file for complete search history.

(56) References Cited

U.S. PATENT DOCUMENTS

| | | | | | |
|---|---|---|---|---|---|
| 4,594,003 | A | * | 6/1986 | Sommargren | 356/489 |
| 5,416,586 | A | * | 5/1995 | Tronolone et al. | 356/513 |
| 5,473,434 | A | * | 12/1995 | de Groot | 356/514 |
| 5,488,477 | A | * | 1/1996 | de Groot | 356/514 |
| 6,184,994 | B1 | * | 2/2001 | Freischlad | 356/511 |
| 6,714,307 | B2 | * | 3/2004 | De Groot et al. | 356/512 |
| 6,781,700 | B2 | * | 8/2004 | Kuchel | 356/513 |
| 7,307,708 | B2 | * | 12/2007 | Murata | 356/127 |
| 7,495,773 | B2 | * | 2/2009 | Dresel | 356/512 |
| 7,511,803 | B2 | * | 3/2009 | Murata | 356/124.5 |
| 7,535,557 | B2 | * | 5/2009 | Wu et al. | 356/127 |
| 7,612,893 | B2 | * | 11/2009 | Kuchel | 356/513 |
| 7,738,117 | B2 | * | 6/2010 | Altenberger et al. | 356/511 |
| 7,948,638 | B2 | * | 5/2011 | Kuchel | 356/515 |
| 2003/0002048 | A1 | * | 1/2003 | Zanoni | 356/512 |
| 2010/0177322 | A1 | * | 7/2010 | Nakauchi | 356/512 |

FOREIGN PATENT DOCUMENTS

JP 2007-333428 12/2007

OTHER PUBLICATIONS

Daniel Malacara, "Optical Shop Testing Third Edition", Wiley Interscience, 2007, pp. 594-595.
A.L. Lowman and J.E. Greivenkamp: "Interferometer Errors Due to the Presence of Fringes"; Applied Optics, vol. 35, No. 34, Jan. 1, 1996, pp. 6826-6828, XP002628795.
DeGroot, P: "Phase-shift Calibration Errors in Interferometers with Spherical Fizeau Cavities", Applied Optics, vol. 34, No. 16, Jun. 1, 1995, pp. 2856-2863, XP002628796.
Moore, R.C. et al. : "Direct Measurement of Phase in a Spherical-Wave Fizeau Interferometer", Applied Optics, vol. 19, No. 13, Jul. 1, 1980, pp. 2196-2200, XP002628797.
Creath, K. et al: "Phase-Shifting Errors in Interferometric Tests with High-Numerical-Aperture Reference Surfaces", Applied Optics, vol. 33, No. 1, Jan. 1, 1994, pp. 24-25, XP002628798.

* cited by examiner

*Primary Examiner* — Tarifur Chowdhury
*Assistant Examiner* — Jonathan Hansen
(74) *Attorney, Agent, or Firm* — Rankin, Hill & Clark LLP

(57) ABSTRACT

A Fizeau interferometer includes: a reference spherical surface; and a measuring apparatus including an intensity obtaining section and a form calculating section, wherein: a focal point of the reference spherical surface is aligned with a center of curvature of the spherical surface in order to set the center of curvature as a center position, and two positions equidistant from the center position are set as a start position and an end position, the intensity obtaining section obtains the intensity maps of the interferograms at n positions at equal intervals; and the form calculating section measures the form of the spherical surface using a phase analysis method in which a coefficient of the intensity maps of the interferograms at an i-th position and a coefficient of the intensity maps of the interferograms at an (n−i+1)th position have a same value.

2 Claims, 12 Drawing Sheets

FIG. 5

|   | | $I_i$ | |
|---|---|---|---|
|   |   | (a) | (b) |
| i | 1 | $I_1 = \cos(\phi)$ | $I_1 = \cos(\phi)$ |
|   | 2 | $I_2 = \cos\left(\phi - \dfrac{\pi}{2}\right)$ | $I_2 = \sin(\phi)$ |
|   | 3 | $I_3 = \cos(\phi - \pi)$ | $I_3 = -\cos(\phi)$ |
|   | 4 | $I_4 = \cos\left(\phi - \dfrac{3\pi}{2}\right)$ | $I_4 = -\sin(\phi)$ |
|   | 5 | $I_5 = \cos(\phi - 2\pi)$ | $I_5 = \cos(\phi)$ |

FIG. 6

| | | $I_i$ | | |
|---|---|---|---|---|
| | | (a) | (b) | (c) |
| i | 1 | $I_1 = \cos(\phi + \Delta_1)$ | $I_1 = \cos(\phi)$ | $I_1 = \cos(\phi)$ |
| | 2 | $I_2 = \cos\left(\phi - \frac{\pi}{2} + \Delta_2\right)$ | $I_2 = \cos\left(\phi - \frac{\pi}{2} + \Delta\right)$ | $I_2 = \sin(\phi + \Delta)$ |
| | 3 | $I_3 = \cos(\phi - \pi + \Delta_3)$ | $I_3 = \cos(\phi - \pi + 2\Delta)$ | $I_3 = -\cos(\phi + 2\Delta)$ |
| | 4 | $I_4 = \cos\left(\phi - \frac{3\pi}{2} + \Delta_4\right)$ | $I_4 = \cos\left(\phi - \frac{3\pi}{2} + 3\Delta\right)$ | $I_4 = -\sin(\phi + 3\Delta)$ |
| | 5 | $I_5 = \cos(\phi - 2\pi + \Delta_5)$ | $I_5 = \cos(\phi - 2\pi + 4\Delta)$ | $I_5 = \cos(\phi + 4\Delta)$ |

FIG. 7

| | | Ii | | |
|---|---|---|---|---|
| | | (a) | (b) | (c) |
| i | 1 | $I_1 = \cos(\phi + \pi + \Delta_1)$ | $I_1 = \cos(\phi + \pi - 2\Delta)$ | $I_1 = -\cos(\phi - 2\Delta)$ |
| | 2 | $I_2 = \cos\left(\phi + \dfrac{\pi}{2} + \Delta_2\right)$ | $I_2 = \cos\left(\phi + \dfrac{\pi}{2} - \Delta\right)$ | $I_2 = -\sin(\phi - \Delta)$ |
| | 3 | $I_3 = \cos(\phi + \Delta_3)$ | $I_3 = \cos(\phi)$ | $I_3 = \cos(\phi)$ |
| | 4 | $I_4 = \cos\left(\phi - \dfrac{\pi}{2} + \Delta_4\right)$ | $I_4 = \cos\left(\phi - \dfrac{\pi}{2} + \Delta\right)$ | $I_4 = \sin(\phi + \Delta)$ |
| | 5 | $I_5 = \cos(\phi - \pi + \Delta_5)$ | $I_5 = \cos(\phi - \pi + 2\Delta)$ | $I_5 = -\cos(\phi + 2\Delta)$ |

FIZEAU INTERFEROMETER AND MEASUREMENT METHOD USING FIZEAU INTERFEROMETER

CROSS-REFERENCE TO RELATED APPLICATION(S)

This application is based upon and claims the benefit of priority from Japanese Patent Application No. 2009-278218, filed on Dec. 8, 2009, the entire contents of which are incorporated herein by reference.

BACKGROUND

1. Field of the Invention

The present invention relates to a Fizeau interferometer and a measurement method using the Fizeau interferometer.

2. Description of the Related Art

Conventionally, a Fizeau interferometer is known, which is equipped with a reference surface for reflecting part of the laser light emitted from a laser light source as reference light, for allowing part of the other part of the laser light to pass through as measurement light and for emitting the measurement light to a surface to be measured, and a measuring apparatus for measuring the form of the surface to be measured on the basis of the interferograms of the reference light and the measurement light reflected by the surface to be measured (for example, refer to JP-A-2007-333428).

The Fizeau interferometer described in JP-A-2007-333428 is equipped with a reference surface and a computer (measuring apparatus) and measures the form of a surface to be measured using a phase shift method. The phase shift method is a method in which the position of a reference surface is moved along the optical axis of laser light to obtain the intensities of interferograms at a plurality of positions and to measure the form of the surface to be measured on the basis of the intensities of these interferograms. Furthermore, this kind of Fizeau interferometer can measure a spherical surface to be measured by forming the reference surface into a spherical surface. In the following descriptions, a reference surface being spherical is referred to as a reference spherical surface, and a surface to be measured having a spherical form is referred to as a spherical surface to be measured.

FIG. 8 is a schematic view showing a state in which the form of the surface of a spherical body is measured using the Fizeau interferometer. More specifically, FIG. 8 is a schematic sectional view sectioned along an xy plane wherein the optical axis direction of the laser light is an x-axis direction and an axis orthogonal to this x-axis is a y-axis. This is because it can be assumed that the ideal measurement optical system of the Fizeau interferometer is rotationally symmetric around the optical axis (x-axis) and is represented in a two-dimensional plane. As shown in FIG. 8, a Fizeau interferometer 100 is equipped with an optical element 110 having a reference spherical surface 111 with a radius R and a measuring apparatus (not shown) and is used to measure the form of the surface of a spherical body 120 with a radius r (hereafter referred to as a spherical surface 121 to be measured). In this figure, a laser light source (not shown) is disposed in the plus x-axis direction (on the right side in FIG. 8) of the optical element 110 and emits laser light in the minus x-axis direction. In FIG. 8, the laser light source emits laser light in the range enclosed by solid lines L1 and L2.

Part of the laser light emitted from the laser light source is reflected by the reference spherical surface 111 and serves as reference light, and part of the other part of the laser light passes through the reference spherical surface 111 and serves as a measurement light. The measurement light is reflected by the spherical surface 121 to be measured, and part of the measurement light reflected by the spherical surface 121 to be measured passes through the reference spherical surface 111. An interferogram is generated by the reference light reflected by the reference spherical surface 111 and the measurement light reflected by the spherical surface 121 to be measured. The measuring apparatus measures the form of the spherical surface 121 to be measured on the basis of the intensity of this interferogram.

Since the Fizeau interferometer 100 measures the displacement between the reference spherical surface 111 and the spherical surface 121 to be measured on the basis of the intensity of the interferogram, the focal point of the reference spherical surface 111 is required to be aligned with the focal point of the spherical surface 121 to be measured, i.e., the center of the spherical body 120. For this reason, when the Fizeau interferometer 100 is used to measure the form of the spherical surface 121 to be measured, an adjustment is carried out in advance so that the focal point of the reference spherical surface 111 is aligned with the center of the spherical body 120. In FIG. 8, the focal point of the reference spherical surface 111 and the center of the spherical body 120 are placed at the origin O of the orthogonal coordinate system shown in FIG. 8.

Hence, for example, in the laser light emitted from the laser light source and entering the optical element 110, the laser light ray passing through point P1 on the reference spherical surface 111, i.e., the measurement light, is emitted in the direction to the origin O. The measurement light is reflected at point P2 on the spherical surface 121 to be measured and enters the optical element 110 at the point P1 on the reference spherical surface 111. Furthermore, interferogram is generated by the reference light reflected at the point P1 and the measurement light entering the optical element 110 at the point P1 and is emitted from the optical element 110 in the plus x-axis direction.

In other words, the measurement light emitted from the reference spherical surface 111 reciprocally travels through the optical paths between the reference spherical surface 111 and the spherical surface 121 to be measured. The measuring apparatus uses a CCD (charge-coupled device) camera (not shown) to image the interferogram of the reference light emitted from the optical element 110 and the measurement light and to obtain an interference fringe image based on optical path difference (OPD), i.e., the intensity of the interferogram. The measuring apparatus then observes this interference fringe image, thereby measuring the form of the spherical surface 121 to be measured. When it is herein assumed that the angle of the point P1 (hereafter referred to as an observation angle) is $\theta$, the coordinates of the point P1 are represented by ($R \cos \theta$, $R \sin \theta$), and the coordinates of the point P2 are represented by ($r \cos \theta$, $r \sin \theta$). Hence, the optical path difference OPD ($\theta$) between the reference light and the measurement light can be represented by the following expression (1).

$$\text{OPD}(\theta) = 2\sqrt{(R\cos\theta - r\cos\theta)^2 + (R\sin\theta - r\sin\theta)^2} \qquad (1)$$

FIG. 9 is a schematic view showing a state in which the position of the reference spherical surface 111 is moved so that the form of the spherical surface 121 to be measured is measured using the phase shift method. When the position of the reference spherical surface 111 is moved along the optical axis of the laser light so as to become close to the spherical body 120 by a distance $\delta$ as shown in FIG. 9, the focal point F of the reference spherical surface 111 is moved y the distance $\delta$ from the origin O b in the minus x-axis direction.

Hence, the coordinates of the point P1 are represented by ($R \cos \theta - \delta$, $R \sin \theta$). Furthermore, since the measurement light passing through the point P1 is emitted in the direction to the focal point F, the measurement light is reflected at point P2' on the spherical surface 121 to be measured. When it is herein assumed that the angle of the point P2' is $\theta'$, the coordinates of the point P2' are represented by ($r \cos \theta'$, $r \sin \theta'$). Hence, the optical path difference OPD ($\theta\theta'$) between the reference light and the measurement light can be represented by the following expression (2).

$$OPD(\theta\theta')_{shift} = 2\sqrt{(R\cos\theta - \delta - r\cos\theta')^2 + (R\sin\theta - r\sin\theta')^2} \quad (2)$$

In the phase shift method, the distance $\delta$ (hereafter referred to as a movement amount $\delta$) through which the position of the reference spherical surface 111 is moved is generally assumed to be approximately half of the wavelength of the laser light emitted from the laser light source or at most approximately two times of the wavelength. In the case that the movement amount $\delta$ is set in this way, the change in the observation angle $\theta$ due to the displacement of the point P2 at which the measurement light is reflected to the point P2' is very small in comparison with the distance between the pixels in an ordinary CCD camera and rarely causes significant change in the interference fringe image. In other words, it can be assumed that $\theta$ is nearly equal to $\theta'$, and the above-mentioned expression (2) can be replaced with the following expression (3).

$$OPD(\theta)_{shift} = 2\sqrt{(R\cos\theta - \delta - r\cos\theta)^2 + (R\sin\theta - r\sin\theta)^2} \quad (3)$$

FIG. 10 is a graph showing the relationship between the amount of change in the optical path difference OPD and the observation angle $\theta$ at the time when the movement amount $\delta$ is changed at constant intervals. In FIG. 10, the vertical axis represents the amount of change in the optical path difference OPD and the horizontal axis represents the observation angle $\theta$. Furthermore, FIG. 10 shows graphs G71 to G79 at the time when the wavelength of the laser light is $\lambda$(=633 nm) and when the movement amount $\delta$ is changed from 0 to $\lambda$ at $\lambda/8$ intervals. FIG. 11 is a graph showing the relationship between the optical path difference OPD and the movement amount $\delta$ at the time when the observation angle $\theta$ is changed at constant intervals. In FIG. 11, the vertical axis represents the optical path difference OPD and the horizontal axis represents the movement amount $\delta$. Furthermore, FIG. 11 shows graphs G81 to G84 at the time when the adjustment is carried out in advance so that the focal point of the reference spherical surface 111 is aligned with the center of the spherical body 120, while the optical path difference OPD is 80 mm and the observation angle $\theta$ is changed 0°, 20°, 40° and 50°. In FIGS. 10 and 11, the radius R of the reference spherical surface 111 is 50 mm and the radius r of the spherical body 120 is 10 mm.

For example, in the graph G79 wherein $\delta$ is equal to $\lambda$, the amount of change in the optical path difference OPD is approximately $2\lambda$ when the observation angle $\theta$ is 0° as shown in FIG. 10. In other words, when the observation angle $\theta$ is 0°, the amount of change in the optical path difference OPD is approximately two times of the movement amount $\delta$, an expected amount of change. This is based on the fact that the measurement light emitted from the reference spherical surface 111 reciprocally travels between the reference spherical surface 111 and the spherical surface 121 to be measured. In addition, as shown in FIG. 11, when it is assumed that the observation angle $\theta$ is constant, the optical path difference OPD changes nearly linearly. More specifically, the optical path difference OPD becomes smaller as the position of the reference spherical surface 111 is moved so as to become closer to the spherical body 120 (the movement amount $\delta$ is in the plus direction) and becomes larger as the position of the reference spherical surface 111 is moved so as to become away from the spherical body 120 (the movement amount $\delta$ is in the minus direction).

On the other hand, as the observation angle $\theta$ becomes larger, the amount of change in the optical path difference OPD becomes smaller than $2\lambda$ as shown in FIG. 10. For example, the amount of change in the optical path difference OPD at the time when the observation angle $\theta$ is 50° is approximately ⅔ of the amount of change at the time when the observation angle $\theta$ is 0°. In other words, the amount of change in the optical path difference OPD differs depending on the observation angle $\theta$ even in the case that the movement amount $\delta$ is the same. Generally speaking, in the phase shift method, the form of the surface to be measured is calculated by applying a specific algorithm to the amount of change in the intensity of the interferogram corresponding to the amount of change in the phase of an interference fringe. Furthermore, since the phase of the interference fringe changes depending on the change in the optical path difference OPD, in the case that the amount of change in the optical path difference OPD does not become its expected amount of change, the amount of change in the phase of the interference fringe does not become its expected amount of change. As a result, an error corresponding to the observation angle $\theta$ occurs when the form of the spherical surface 121 to be measured is measured using the phase shift method.

Next, the relationship between a measurement error occurring in the phase shift method and the observation angle $\theta$ will be examined. The relationship between the intensity I of the interferogram and the movement amount $\delta$ can be represented by the following expression (4).

$$I_i = I_0 + A\cos\left(OPD(\theta)_{\delta i} \cdot \frac{2\pi}{\lambda} + \phi(\theta)\right) \quad (4)$$

In this expression, $\phi(\theta)$ is the initial phase angle of the fluctuation component of a signal based on the intensity of the interferogram and is the difference between the reference spherical surface 111 and the spherical surface 121 to be measured when the adjustment is carried out in advance so that the focal point of the reference spherical surface 111 is aligned with the center of the spherical body 120, i.e., the form of the spherical surface 121 to be measured. Furthermore, $I_o$ is an offset of a signal based on the intensity of the interferogram, and A is the amplitude of the fluctuation component of this signal. Moreover, the first term of the cos function represents a known value that is obtained by converting the optical path difference OPD($\theta$) at the time when the reference spherical surface 111 is located at the position (movement amount $\delta_i$) indicated by a suffix i into a phase based on the wavelength $\lambda$ of the laser light. Hence, when it is assumed that the intensity of the interferogram at the time when the reference spherical surface 111 is located at the position indicated by a suffix i is $I_i$, since unknown quantities in the expression (4) are three quantities, i.e., $I_o$, A and $\phi(\theta)$, once the intensities $I_i$ of at least three interferograms are obtained, $\phi(\theta)$, i.e., the form of the spherical surface to be measured, can be known by solving simultaneous equations.

Furthermore, in the phase shift method, numerous methods have been proposed with respect to the combinations of the movement amounts $\delta_i$ for obtaining $\phi(\theta)$, i.e., the form of the spherical surface to be measured, and specific algorithms corresponding thereto. For example, $\phi(\theta)$ can be calculated by using such algorithms as represented in the following expressions (5) and (6) (Daniel Malacara, Optical Shop Testing Third Edition, Wiley Interscience, 2007, pp 594-595).

$$\phi(\theta) = \tan^{-1}\left[\frac{2(I_4 - I_2)}{I_1 - 2I_3 + I_5}\right] \quad (5)$$

$$\phi(\theta) = \tan^{-1}\left[\frac{7(I_3 - I_5) - (I_1 - I_7)}{8I_4 - 4(I_2 + I_6)}\right] \quad (6)$$

More specifically, the expression (5) represents an algorithm (hereafter referred to as a 5-step method) that is used when the intensities of the interferograms at five positions are obtained by changing the movement amount δ from 0 at λ/8 intervals so that the phase of the interference fringe is changed at π/2 intervals. The expression (6) represents an algorithm (hereafter referred to as a 7-step method) that is used when the intensities of the interferograms at seven positions are obtained by changing the movement amount δ from 0 at λ/8 intervals so that the phase of the interference fringe is changed at n/2 intervals.

FIG. 12 is a graph showing the relationship between a measurement error occurring in the phase shift method and the observation angle θ. In FIG. 12, it is assumed that the spherical surface 121 to be measured is an ideal spherical surface, and the measurement error occurring in the 5-step method is shown in a graph G91 and the measurement error occurring in the 7-step method is shown in a graph G92. Furthermore, in FIG. 12, the vertical axis represents the measurement error, and the horizontal axis represents the observation angle θ.

As described above, when the observation angle θ is 0°, the amount of change in the optical path difference OFD has become its expected amount of change. Hence, the measurement error is 0 as shown in FIG. 12.

On the other hand, when the observation angle θ is 50° for example, the amount of change in the optical path difference OPD is approximately ⅔ of the amount of change at the time when the observation angle θ is 0° as described above. Hence, the error in form is larger than that at the time when the observation angle θ is 0°. In addition, the measurement error occurring in the 7-step method is larger than the measurement error occurring in the 5-step method.

As described above, in the case that the phase shift method is used when the form of the surface of the spherical body 120 is measured using the Fizeau interferometer 100, the amount of change in the optical path difference OPD does not become its expected value due to the relationship to the observation angle θ but generates a measurement error, whereby there is a problem that the form of the spherical surface 121 to be measured cannot be measured properly.

SUMMARY

An object of the present invention is to provide a Fizeau interferometer capable of properly measuring the form of a spherical surface to be measured even in the case that a phase shift method is used and to provide a measurement method using the Fizeau interferometer.

According to an aspect of the invention, there is provided a Fizeau interferometer including: a laser light source emitting a laser light; an imaging device detecting interferograms; a reference spherical surface configured to reflect part of the laser light emitted from a laser light source as a reference light, configured to allow the other part of the laser light to pass through as a measurement light and configured to incident the measurement light to a spherical surface to be measured; and a measuring apparatus configured to measure a form of the spherical surface using interferogram of the reference light and the measurement light reflected by the spherical surface, wherein: the measuring apparatus includes: an intensity obtaining section configured to obtain intensity maps of interferograms at a plurality of positions by moving a position of the reference spherical surface along an optical axis of the laser light; and a form calculating section configured to calculate the form of the spherical surface using the intensity maps of the interferograms obtained by the intensity obtaining section; a focal point of the reference spherical surface is aligned with a center of curvature of the spherical surface in order to set the center of curvature as a center position, and two positions equidistant from the center position are set as a start position and an end position, the intensity obtaining section obtains the intensity maps of the interferograms at n positions at equal intervals; and the form calculating section measures the form of the spherical surface using a phase analysis method in which a coefficient of the intensity maps of the interferograms at an i-th position and a coefficient of the intensity maps of the interferograms at an (n−i+1)th position have a same value.

In the algorithms of the phase shift method, such as the 5-step method and the 7-step method, as shown in the expressions (5) and (6), it is assumed that, among a plurality of positions at which the intensities of the interferograms are obtained, the coefficients of the intensities of the interferograms obtained at the symmetric positions on both sides with respect to the center position are set to have the same value. More specifically, for example, in the 5-step method, as shown in the expression (5), the coefficients of the intensities, such as $I_1$ and $I_5$ and such as $I_2$ and $I_4$, of the interferograms at the symmetric positions on both sides with respect to the center position are set to have the same value. This setting is used to compress measurement errors by virtue of the effect of averaging. In other words, in the algorithms of the phase shift method, such as the 5-step method and the 7-step method, the coefficient of the intensity of the interferogram at the i-th position and the coefficient of the intensity of the interferogram at the (n−i+1)th position are set to have the same value.

In addition, as described above, when it is assumed that the observation angle θ is constant, the optical path difference OPD changes nearly linearly. More specifically, the optical path difference OPD becomes smaller as the position of the reference spherical surface is moved so as to become closer to the spherical surface to be measured and becomes larger as the position of the reference spherical surface is moved so as to become away from the spherical surface to be measured. In other words, the position of the reference spherical surface at the time when the focal point of the reference spherical surface is aligned with the focal point of the spherical surface to be measured is set as the center position, two positions equidistant from the center position are set as a start position and an end position, respectively, and the intensities of the interferograms at n positions are obtained at equal intervals. As a result, the amount of change in the optical path difference OPD at the i-th position and the amount of change in the optical path difference OPD at the (n−i+1)th position have nearly the same values with opposite signs.

The Fizeau interferometer according to the present invention is equipped with an intensity obtaining section for obtaining the intensities of the interferograms at n positions at equal intervals while the position of the reference spherical surface at the time when the focal point of the reference spherical surface is aligned with the focal point of the spherical surface to be measured is set as the center position and two positions equidistant from the center position are set as a start position and an end position, respectively, and is also equipped with a form calculating section for measuring the form of a spherical surface to be measured using the algorithm of a phase shift method wherein the coefficient of the intensity of the interferogram at the i-th position and the coefficient of the intensity of the interferogram at the (n−i+1)th position have the same value. Hence, the Fizeau interferometer can reduce measurement errors occurring in the phase shift method and can properly measure the form of the spherical surface to be measured even in the case that the phase shift method is used.

According to another aspect of the invention, there is provided a measurement method using a Fizeau interferometer including: a laser light source emitting a laser light; an imaging device detecting interferograms; a reference spherical surface configured to reflect part of the laser light emitted from a laser light source as a reference light, configured to allow the other part of the laser light to pass through as a measurement light and configured to incident the measurement light to a spherical surface to be measured; and a measuring apparatus configured to measure a form of the spherical surface using interferogram of the reference light and the measurement light reflected by the spherical surface, the method including: obtaining intensity maps of interferograms at a plurality of positions by moving a position of the reference spherical surface along an optical axis of the laser light; and measuring calculate the form of the spherical surface using the obtained intensity maps of the interferograms, wherein at the obtaining, a focal point of the reference spherical surface is aligned with a center of curvature of the spherical surface in order to set the center of curvature as a center position, and two positions equidistant from the center position are set as a start position and an end position, the intensity maps of the interferograms at n positions are obtained at equal intervals, and at the measuring, the form of the spherical surface is measured using a phase analysis method in which a coefficient of the intensity maps of the interferograms at an i-th position and a coefficient of the intensity maps of the interferograms at an (n−i+1)th position have a same value. With this configuration, working effects similar to those of the above-mentioned Fizeau interferometer can be obtained.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 5 is a table showing the intensities of ideal interferograms obtained using a 5-step method to which the conventional measurement method is applied;

FIG. 6 is a table showing the intensities of actual interferograms obtained using the 5-step method to which the conventional measurement method is applied;

FIG. 7 is a table showing the intensities of actual interferograms obtained using the 5-step method to which the measurement method according to the present invention is applied;

DETAILED DESCRIPTION OF THE INVENTION

An embodiment according to the present invention will be described below on the basis of the accompanying drawings.

Figure 1:
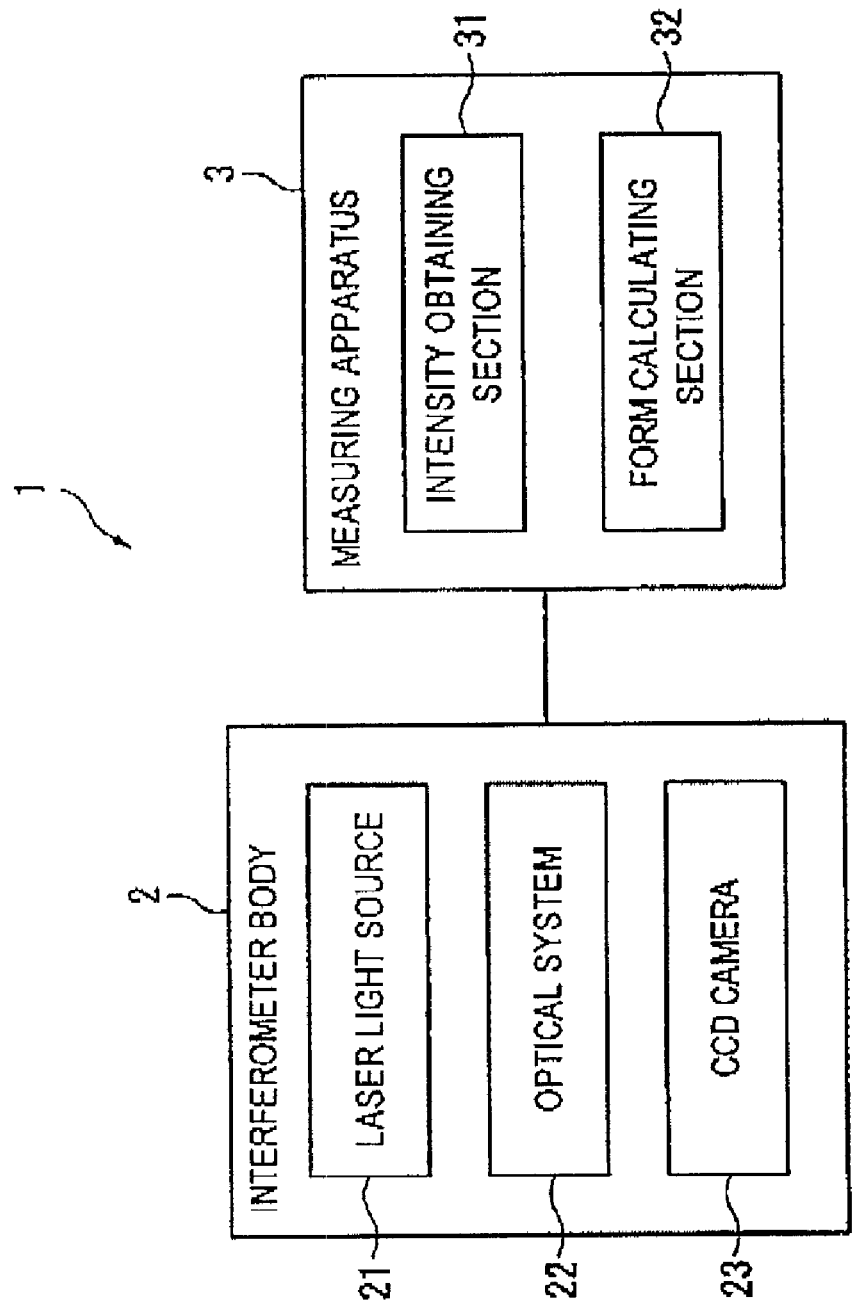
FIG. 1 is a block diagram showing a Fizeau interferometer according to an embodiment of the present invention.

FIG. 1 is a block diagram showing a Fizeau interferometer 1 according to an embodiment of the present invention. The Fizeau interferometer 1 is equipped with an interferometer body 2 and a measuring apparatus 3 as shown in FIG. 1. The interferometer body 2 is equipped with a laser light source 21 for emitting laser light; an optical system 22 formed of, for example, a reference spherical surface 221 (see FIGS. 3A to 3B) in which part of the laser light emitted from the laser light source 21 is reflected as reference light, part of the other part of the laser light is allowed to pass through as measurement light, and this measurement light is emitted to a spherical surface WS to be measured (see FIGS. 3A to 3B); and a CCD camera 23 for imaging the interferogram of the reference light and the measurement light reflected by the spherical surface WS to be measured to obtain an interference fringe image. The interferometer body 2 has a configuration similar to that of the Fizeau interferometer described in JP-A-2007-333428.

The measuring apparatus 3 is used to measure the form of the spherical surface WS to be measured on the basis of the interference fringe image obtained using the CCD camera 23 and is equipped with an intensity obtaining section 31 and a form calculating section 32. The intensity obtaining section 31 obtains interference fringe images, i.e., the intensities (intensity maps) of interferograms, at a plurality of positions by moving the position of the reference spherical surface 221 along the optical axis of the laser light. The form calculating section 32 measures the form of the spherical surface WS to be measured on the basis of the interference fringe images obtained by the intensity obtaining section 31, i.e., the intensities of the interferograms.

Figure 2:
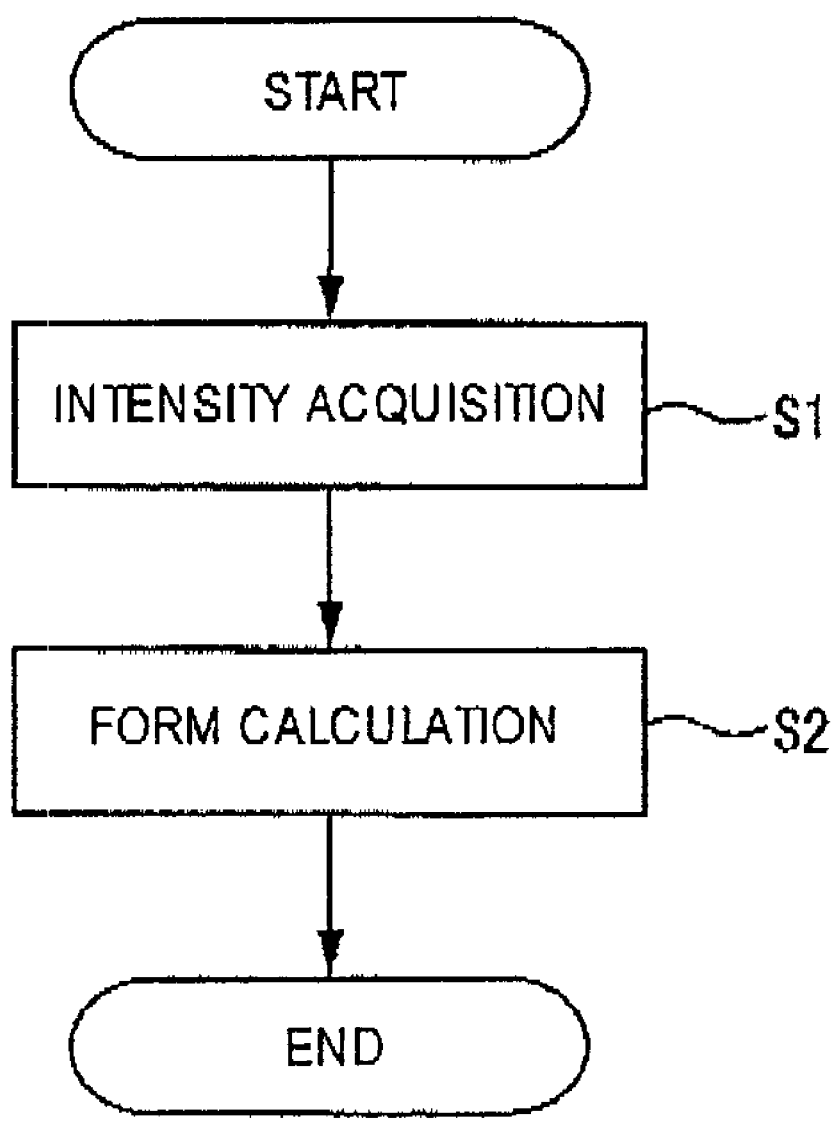
FIG. 2 is a flowchart showing a measurement method using the Fizeau interferometer according to the embodiment.

FIG. 2 is a flowchart showing a measurement method using the Fizeau interferometer 1. When measurement starts, the measuring apparatus 3 executes the following steps S1 and S2 as shown in FIG. 2. First, the intensity obtaining section 31 obtains the intensities of the interferograms at the plurality of positions by moving the position of the reference spherical surface 221 along the optical axis of the laser light (step S1: intensity obtaining step).

Figure 3A:
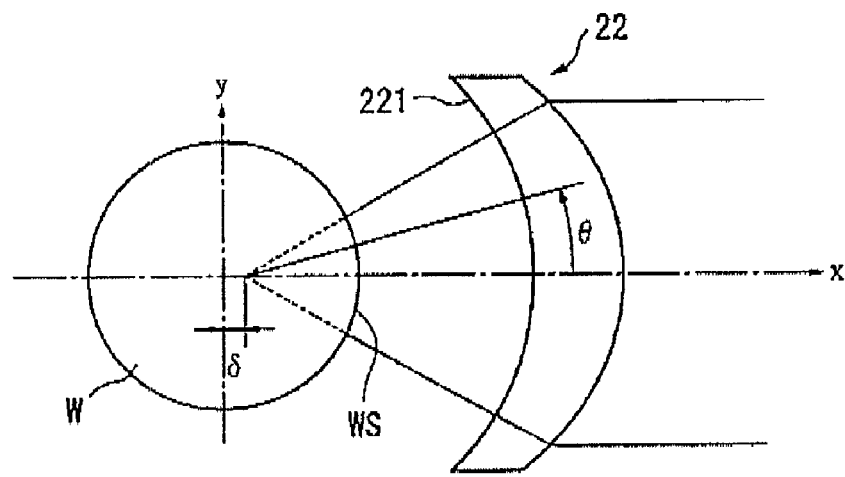
FIGS. 3A to 3C are schematic views showing states in which an intensity obtaining section according to the embodiment obtains interference fringe images.
Figure 3B:
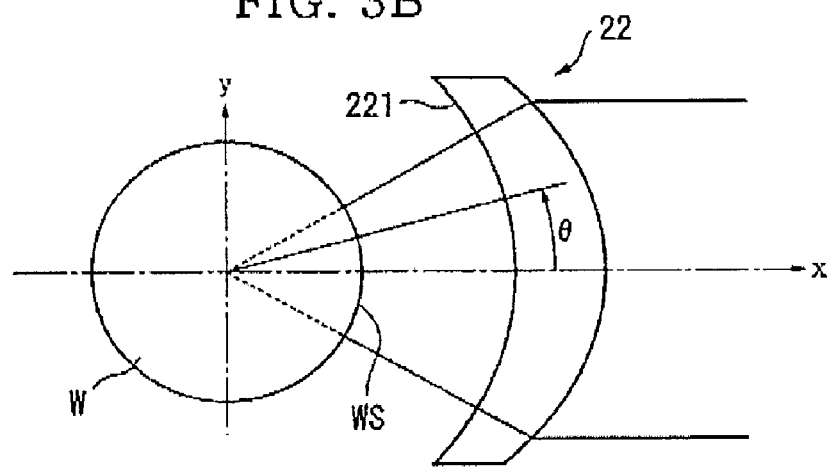
Figure 3C:
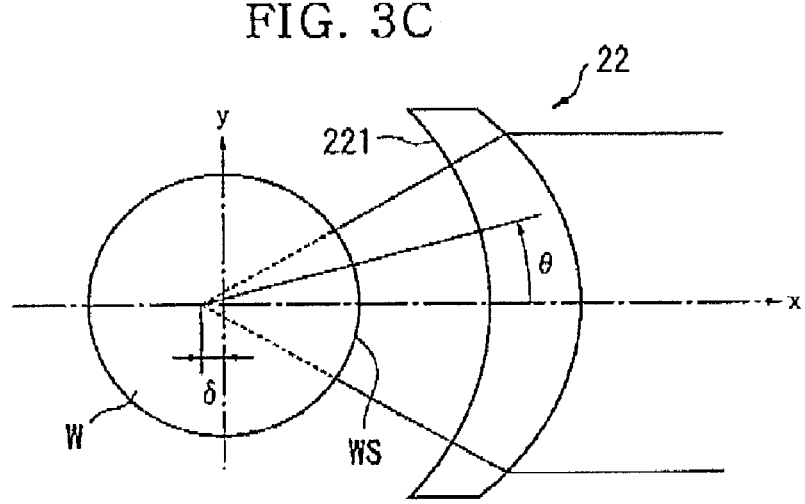

FIGS. 3A to 3C are schematic views showing states in which the intensity obtaining section 31 obtains the intensities of the interferograms. In FIGS. 3A to 3C, the spherical surface WS to be measured is the surface of a spherical body W. Furthermore, FIGS. 3A to 3C are schematic sectional views sectioned along an xy plane wherein the optical axis direction of the laser light is an x-axis direction and an axis orthogonal to this x-axis is a y-axis. More specifically, as shown in FIGS. 3A to 3C, the intensity obtaining section 31 obtains the intensities of the interferograms at n positions at equal intervals while the position of the reference spherical surface 221 at the time when the focal point (center of curvature) of the reference spherical surface 221 is aligned with the focal point of the spherical surface WS to be measured is set as a center position (see FIG. 3B) and two positions equidistant from this center position on the x-axis are set as a start position (see FIG. 3A) and an end position (see FIG. 3C), respectively. Furthermore, FIGS. 3A to 3C exemplify states in which the intensities of the interferograms at three positions in FIGS. 3A to 3C are obtained while the movement amount δ on the right side is equal to the movement amount δ on the left side. In the case that the 5-step method is used as the algorithm of the phase shift method, the intensities of the interferograms at five positions are obtained at equal intervals, and in the case that the 7-step method is used, the intensities of the interferograms at seven positions are obtained at equal intervals.

When the intensities of the interferograms at the plurality of positions are obtained at the intensity obtaining step S1, the form calculating section 32 measures the form of the spherical surface WS to be measured on the basis of the intensities of the interferograms (S2: form calculating step). More specifically, the form calculating section 32 measures the form of the spherical surface WS to be measured using the algorithm of the phase shift method in which the coefficient of the intensity of the interferogram at the i-th position and the coefficient of the intensity of the interferogram at the (n−i+1)th position are set to have the same value as in the cases of the 5-step method and the 7-step method.

Figure 4A:
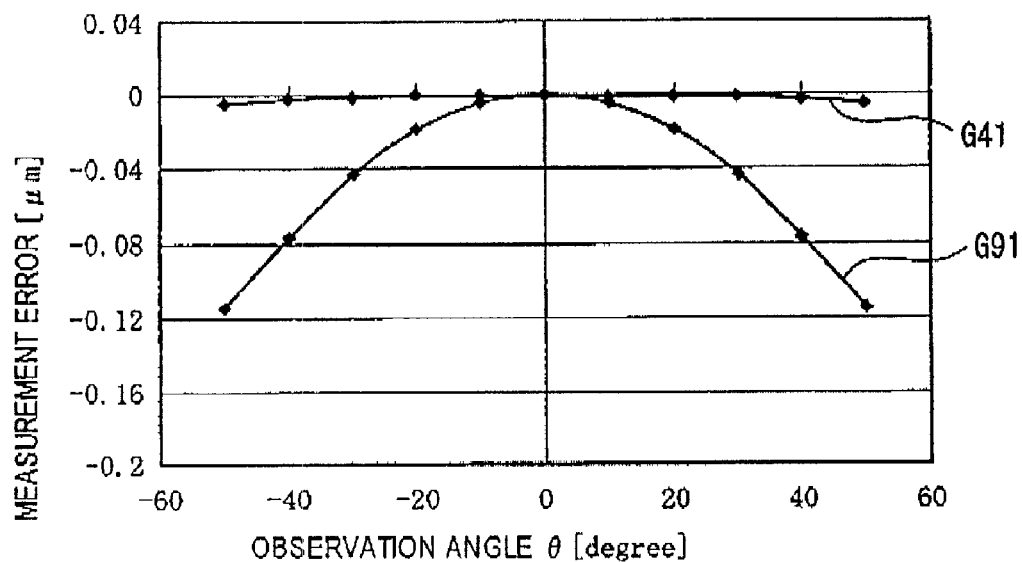
FIGS. 4A and 4B are graphs showing the relationship between a measurement error occurring in a phase shift method according to the embodiment and an observation angle.
Figure 4B:
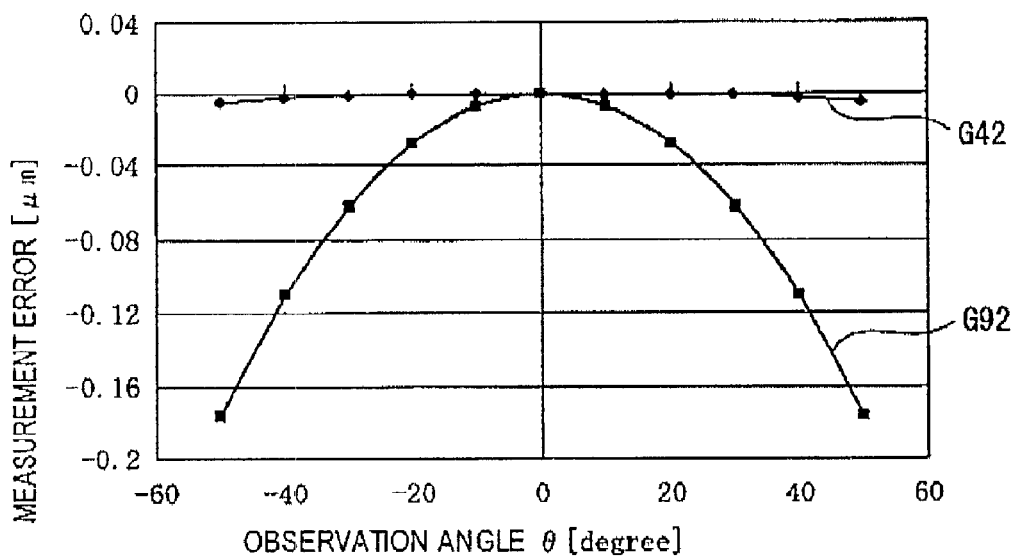
Figure 8:
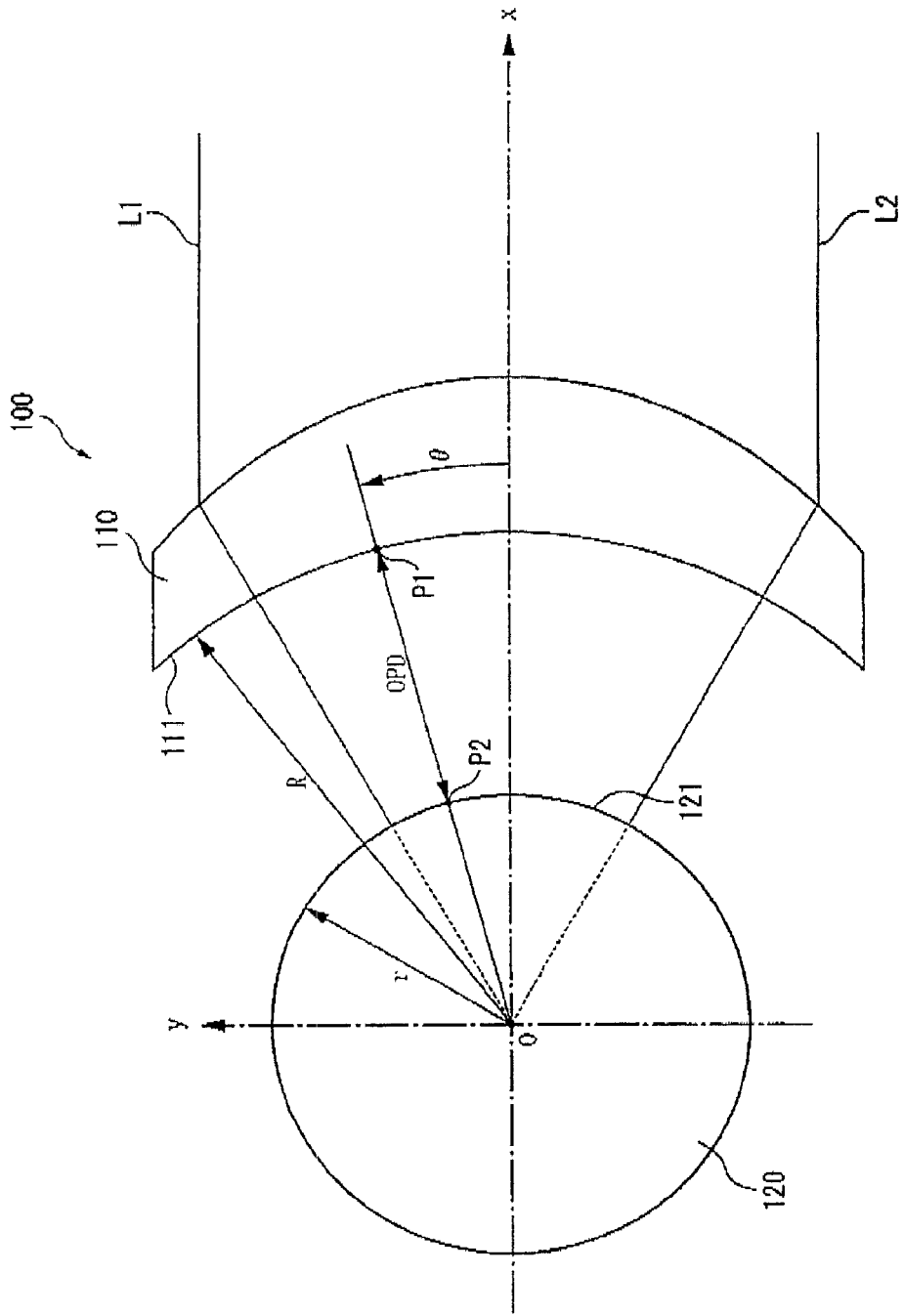
FIG. 8 is a schematic view showing a state in which the form of the surface of a spherical body is measured using the Fizeau interferometer.
Figure 9:
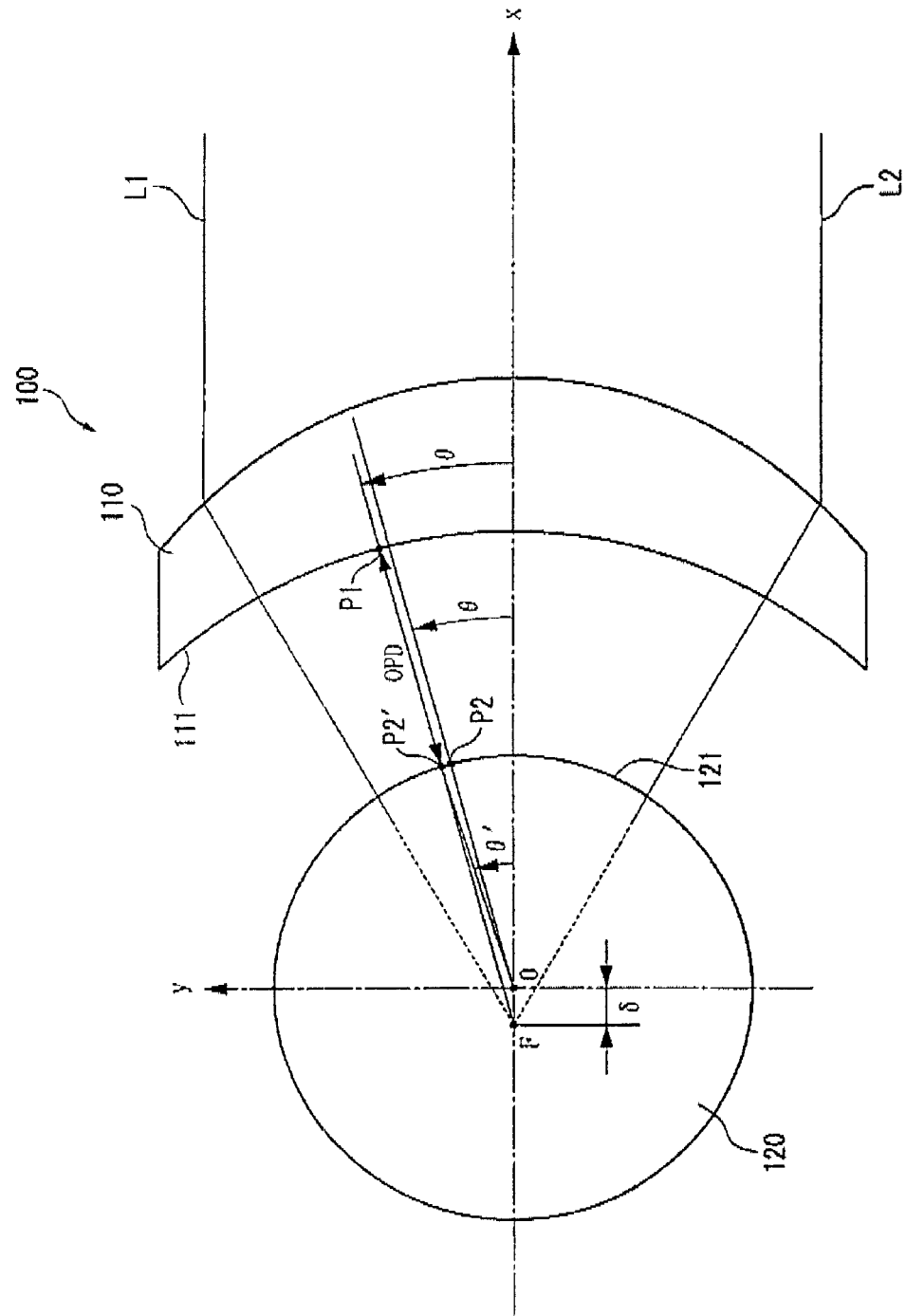
FIG. 9 is a schematic view showing a state in which the position of a reference spherical surface is moved so that the form of a spherical surface to be measured is measured using the phase shift method.
Figure 10:
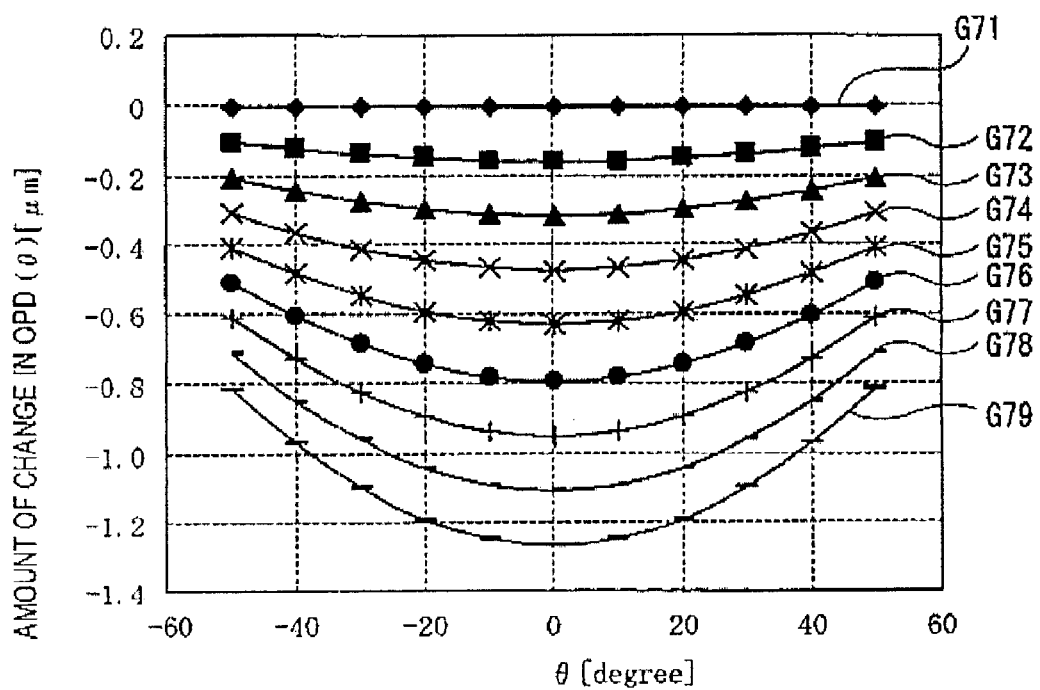
FIG. 10 is a graph showing the relationship between the amount of change in the optical path difference and the observation angle at the time when the movement amount is constant.
Figure 12:
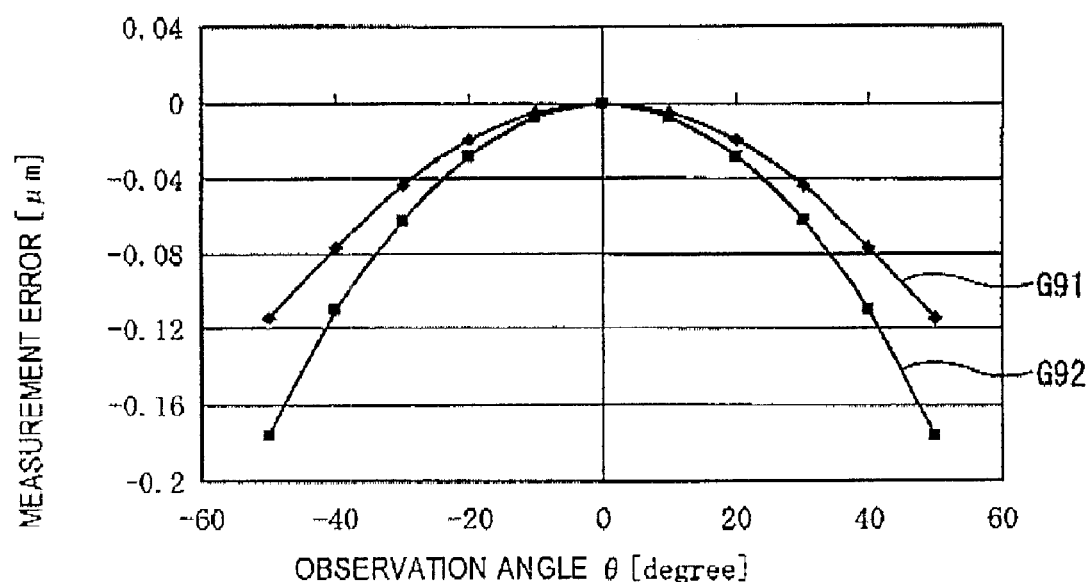
FIG. 12 is a graph showing the relationship between a measurement error occurring in the phase shift method and the observation angle.

FIGS. 4A and 4B are graphs showing the relationship between a measurement error occurring in the phase shift method and an observation angle θ. In FIGS. 4A and 4B, it is assumed that the spherical surface WS to be measured is an ideal spherical surface. Furthermore, FIG. 4A shows a graph G91 depicting measurement errors occurring in the 5-step method to which the conventional measurement method is applied (see FIG. 12) and also shows a graph G41 depicting measurement errors occurring in the 5-step method to which the measurement method according to the present invention is applied. Moreover, FIG. 4B shows a graph G92 depicting measurement errors occurring in the 7-step method to which the conventional measurement method is applied (see FIG. 12) and also shows a graph G42 depicting measurement errors occurring in the 7-step method to which the measurement method according to the present invention is applied. The measurement errors occurring in the 5-step method and the 7-step method to which the measurement method according to the present invention is applied are approximately 5 nm when the observation angle is in the range of ±50° as shown in FIGS. 4A and 4B, thereby being smaller than the measurement errors occurring in the 5-step method and the 7-step method to which the measurement method to which the conventional measurement method is applied.

The reason why the measurement errors occurring in the phase shift method can be reduced by applying the measurement method according to the present invention will be described below specifically.

FIG. 5 is a table showing the intensities of ideal interferograms obtained using the 5-step method to which the conventional measurement method is applied. In FIG. 5, it is assumed that the phase of the interference fringe changes as expected and that $I_o$ is O, A is 1 and the observation angle θ is constant in the above-mentioned expression (4) for the sake of simple explanation. These assumptions are applicable similarly in the following figures. In the case that the 5-step method is used as the algorithm of the phase shift method, the intensities Ii of the intertezograms at five positions are obtained by changing the movement amount δ from 0 at λ/8 intervals. Hence, the phase of the interference fringe at the time when the reference spherical surface is located at the position (movement amount $δ_i$) indicated by a suffix i changes at π/2 intervals as shown in the column (a) of the table in FIG. 5. In addition, the column (a) of the table in FIG. 5 can be converted into the column (b) thereof.

Figure 11:
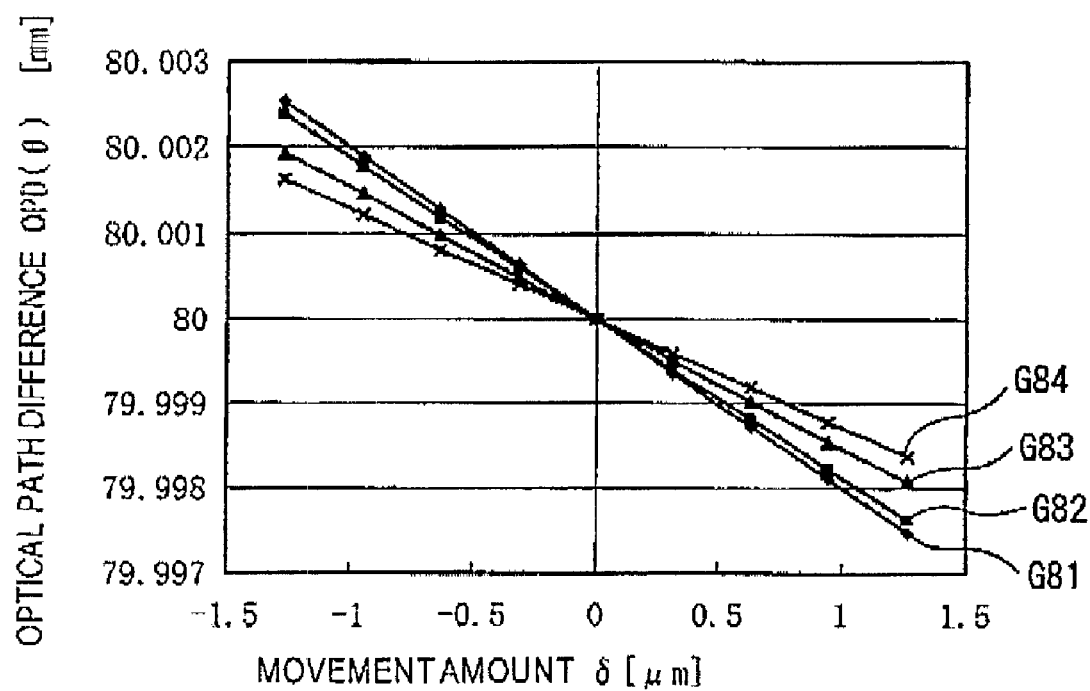
FIG. 11 is a graph showing the relationship between the optical path difference and the movement amount at the time when the observation angle is constant.

FIG. 6 is a table showing the intensities of actual interferograms obtained using the 5-step method to which the conventional measurement method is applied. When it is assumed that the displacement amount between the expected value of the amount of change in the phase of the interference fringe and the actual value thereof is $Δ_i$, the phase of the interference fringe at the time when the reference spherical surface is located at the position indicated by a suffix i changes as shown in the column (a) of the table in FIG. 6. When it is assumed that the observation angle θ is constant, the optical path difference OPD changes nearly linearly as described above (see FIG. 11), and the amount of change in the phase of the interference fringe also changes nearly linearly. Hence, the displacement amount $Δ_i$ also changes nearly linearly. Hence, when it is assumed that the displacement amount at the time when the movement amount δ is changed only by λ/8 is Δ, the column (a) of the table in FIG. 6 can be rewritten into the column (b) thereof. In addition, the column (b) of the table in FIG. 6 can be converted into the column (a) thereof. Furthermore, when $I_1$ to $I_5$ in the column (c) of the table in FIG. 6 are substituted into the above-mentioned explanation (5), the term of the arc tan function can be represented by the following expression (7).

$$\frac{2(I_4 - I_2)}{I_1 - 2I_3 + I_5} = \frac{-2(\sin(\phi + 3\Delta) + \sin(\phi + \Delta))}{\cos(\phi) + 2\cos(\phi + 2\Delta) + \cos(\phi + 4\Delta)} \quad (7)$$

$$= \frac{-4\sin(\phi + 2\Delta)\cos\Delta}{2\cos(\phi + 2\Delta)(1 + \cos 2\Delta)}$$

$$= -\tan(\phi + 2\Delta)\frac{2\cos\Delta}{(1 + \cos 2\Delta)}$$

FIG. 7 is a table showing the intensities of actual interferograms obtained using the 5-step method to which the measurement method according to the present invention is applied. In the case that the measurement method according to the present invention is applied instead of the conventional measurement method, the phase of the interference fringe at the time when the reference spherical surface is located at the position indicated by a suffix i changes as shown in the columns (a) to (c) of the table in FIG. 7. Furthermore, when $I_1$ to $I_5$ in the column (c) of the table in FIG. 7 are substituted into the above-mentioned explanation (5), the term of the arc tan function can be represented by the following expression (8).

$$\frac{2(I_4 - I_2)}{I_1 - 2I_3 + I_5} = \frac{2(\sin(\phi + \Delta) + \sin(\phi + \Delta))}{-\cos(\phi - 2\Delta) - 2\cos\phi - \cos(\phi + 2\Delta)} \quad (8)$$

$$= \frac{4\sin\phi\cos\Delta}{-2\cos\phi(1 + \cos 2\Delta)}$$

$$= -\tan\phi \frac{2\cos\Delta}{(1 + \cos 2\Delta)}$$

In the above-mentioned expression (7), Δ contained in the term of the tan function is cancelled in the expression (8). Hence, in the case that the measurement method according to the present invention is applied, it can be confirmed that the measurement errors occurring in the phase shift method can be reduced. The second term of the expression (8) is formed of a cos function containing Δ, and measurement errors based on this term cannot be reduced by merely applying the measurement method according to the present invention. However, since the function form of the term is known, the measurement errors can be reduced easily by making numerical correction.

Furthermore, in the case that the 7-step method is used as the algorithm of the phase shift method, the term of the arc tan function in the case that the conventional measurement method is applied can be represented by the following expression (9), and the term of the arc tan function in the case that the measurement method according to the present invention is applied can be represented by the following expression (10). Since the procedure for deriving the expressions (9) and (10) is similar to that used in the case that the 5-step method is used as the algorithm of the phase shift method, the detailed description thereof is omitted.

$$\frac{7(I_3 - I_5) - (I_1 - I_7)}{8I_4 - 4(I_2 + I_6)} = -\tan\left(\phi + 3\Delta + \frac{\pi}{2}\right) \cdot \frac{\cos^2\Delta + 1}{2\cos\Delta} \quad (9)$$

$$\frac{7(I_3 - I_5) - (I_1 - I_7)}{8I_4 - 4(I_2 + I_6)} = -\tan\phi \cdot \frac{\cos^2\Delta + 1}{2\cos\Delta} \quad (8)$$

In the expression (9), Δ contained in the term of the tan function is cancelled in the expression (10). Hence, in the case that the measurement method according to the present invention is applied, it can be confirmed that the measurement errors occurring in the phase shift method can be reduced. The second term of the expression (10) is formed of a cos function containing Δ, and measurement errors based on this term cannot be reduced by merely applying the measurement method according to the present invention. However, since the function form of the term is known, the measurement errors can be reduced easily by making numerical correction.

The following effects can be produced by the embodiment described above. The Fizeau interferometer 1 is equipped with the intensity obtaining section 31 for obtaining the intensities of the interferograms at the n positions at equal intervals while the position of the reference spherical surface 221 at the time when the focal point of the reference spherical surface 221 is aligned with the focal point of the spherical surface WS to be measured is set as the center position and the two positions equidistant from the center position are set as the start position and the end position, respectively, and is also equipped with the form calculating section 32 for measuring the form of the spherical surface WS to be measured using the algorithm of the phase shift method wherein the coefficient of the intensity of the interferogram at the i-th position and the coefficient of the intensity of interferogram at the (n−i+1)th position have the same value. Hence, the Fizeau interferometer can reduce measurement errors occurring in the phase shift method and can properly measure the form of the spherical surface WS to be measured even in the case that the phase shift method is used.

The present invention is not limited to the above-mentioned embodiment, and modifications, improvements, etc. in the range in which the object of the present invention can be accomplished are contained in the present invention. For example, although the 5-step method and the 7-step method are exemplified as the algorithms of the phase shift method in the above-mentioned embodiment, the algorithm of the phase shift method should only be the algorithm of the phase shift method in which the coefficients of the intensities of the interferograms obtained at the symmetric positions on both sides with respect to the center position, among the plurality of positions at which the intensities of the interferograms are obtained, have the same value. In the above-mentioned embodiment, although the 5-step method and the 7-step method in which the intensities of the interferograms at odd numbers of positions are obtained are exemplified as the algorithms of the phase shift method, the algorithm of the phase shift method may be an algorithm that is used to obtain the intensities of the interferograms at even numbers of positions.

In the above-mentioned embodiment, although the spherical surface WS to be measured is the surface of the spherical body W, it may be, for example, the surface of a lens or the like. In short, the spherical surface to be measured should only be a surface to be measured having a spherical form. In the above-mentioned embodiment, although the present invention is explained in a two-dimensional plane (xy plane), the present invention is also applicable in a three-dimensional space.

The present invention can be used for a Fizeau interferometer and a measurement method using the Fizeau interferometer, more particularly, can be favorably used for a Fizeau interferometer for measuring the form of a spherical surface to be measured using the phase shift method and for the measurement method using the Fizeau interferometer.

What is claimed is:

1. A Fizeau interferometer comprising:
   a laser light source emitting a laser light;
   an imaging device detecting interferograms;
   a reference spherical surface configured to reflect part of the laser light emitted from a laser light source as a reference light, configured to allow the other part of the laser light to pass through as a measurement light and configured to incident the measurement light to a spherical surface to be measured; and
   a measuring apparatus configured to measure a form of the spherical surface using interferogram of the reference light and the measurement light reflected by the spherical surface, wherein:
   the measuring apparatus includes;
   an intensity obtaining section configured to determine a center position of the reference spherical surface where a focal point of the reference spherical surface is aligned with a focal point of the spherical surface to be measured, and obtain intensity maps of interferograms at n positions (n is 3, 5, or 7) by moving a position of the reference spherical surface along an optical axis of the laser light at equal intervals from a first position to a second position, a distance from the first position to the center position is equal to a distance from the center position to the second position; and a form calculating section configured to set a coefficient of the intensity map of the interferogram at an i th position (i is an integer and $1 \leq i \leq n-1$) equal to a coefficient of the intensity map of the interferogram at an (n−i+1) th position in a phase analysis and calculate the form of the spherical surface using the intensity maps of the interferograms obtained by the intensity obtaining section.

2. A measurement method of a form of a spherical surface using a Fizeau interferometer, comprising:

emitting a laser light;

making a reference light by reflecting part of the laser light at a reference spherical surface allowing the other part of the laser light to pass through the reference spherical surface as a measurement light and providing the measurement light to a spherical surface to be measured;

determining a center position of the reference spherical surface on an optical axis of the laser light where a focal point of the reference spherical surface is aligned with a focal point of the spherical surface to be measured;

obtaining intensity maps of interferograms at n positions (n is 3, 5, or 7) by moving a position of the reference spherical surface along the optical axis of the laser light from a first position to a second position, a distance from the first position to the center position is equal to a distance from the center position to the second position;

setting a coefficient of the intensity map of the interferogram at an i th position (i is an integer and $1 \leq i \leq n-1$) equal to a coefficient of the intensity map of the interferogram at an (n−i+1) th position in a phase analysis; and measuring the form of the spherical surface using the obtained intensity maps of the interferograms.

* * * * *